J. W. FAESSLER.
APPARATUS FOR BOILER FLUE WORK.
APPLICATION FILED DEC. 11, 1907.

906,865.

Patented Dec. 15, 1908.

2 SHEETS—SHEET 2.

Attest.
E. M. Harrington
M. P. Smith

Inventor:
John W. Faessler.
By Higdon & Longan Attys

UNITED STATES PATENT OFFICE.

JOHN W. FAESSLER, OF MOBERLY, MISSOURI.

APPARATUS FOR BOILER-FLUE WORK.

No. 906,865.  Specification of Letters Patent.  Patented Dec. 15, 1908.

Application filed December 11, 1907. Serial No. 406,086.

*To all whom it may concern:*

Be it known that I, JOHN W. FAESSLER, a citizen of the United States, and resident of Moberly, Randolph county, Missouri, have invented certain new and useful Improvements in Apparatus for Boiler-Flue Work, of which the following is a specification containing a full, clear, and exact description, reference being had to the accompanying drawings, forming a part hereof.

My invention relates to an apparatus for mechanically operating flue cutters, tube expanders, and like tools generally used on boiler tubes and flues, and the principal object of my invention is to generally improve the construction of a similar apparatus for which a patent was issued to me September 6, 1904, No. 769,310.

A further object of my invention is to construct an apparatus wherein a motor is utilized for driving the tool, and which motor and apparatus is so arranged as to be readily controlled and operated by one man.

To the above purposes, my invention consists in certain novel features of construction and arrangement of parts, which will be hereinafter more fully set forth, pointed out in the claim, and illustrated in the accompanying drawings, in which:—

Figure 1:
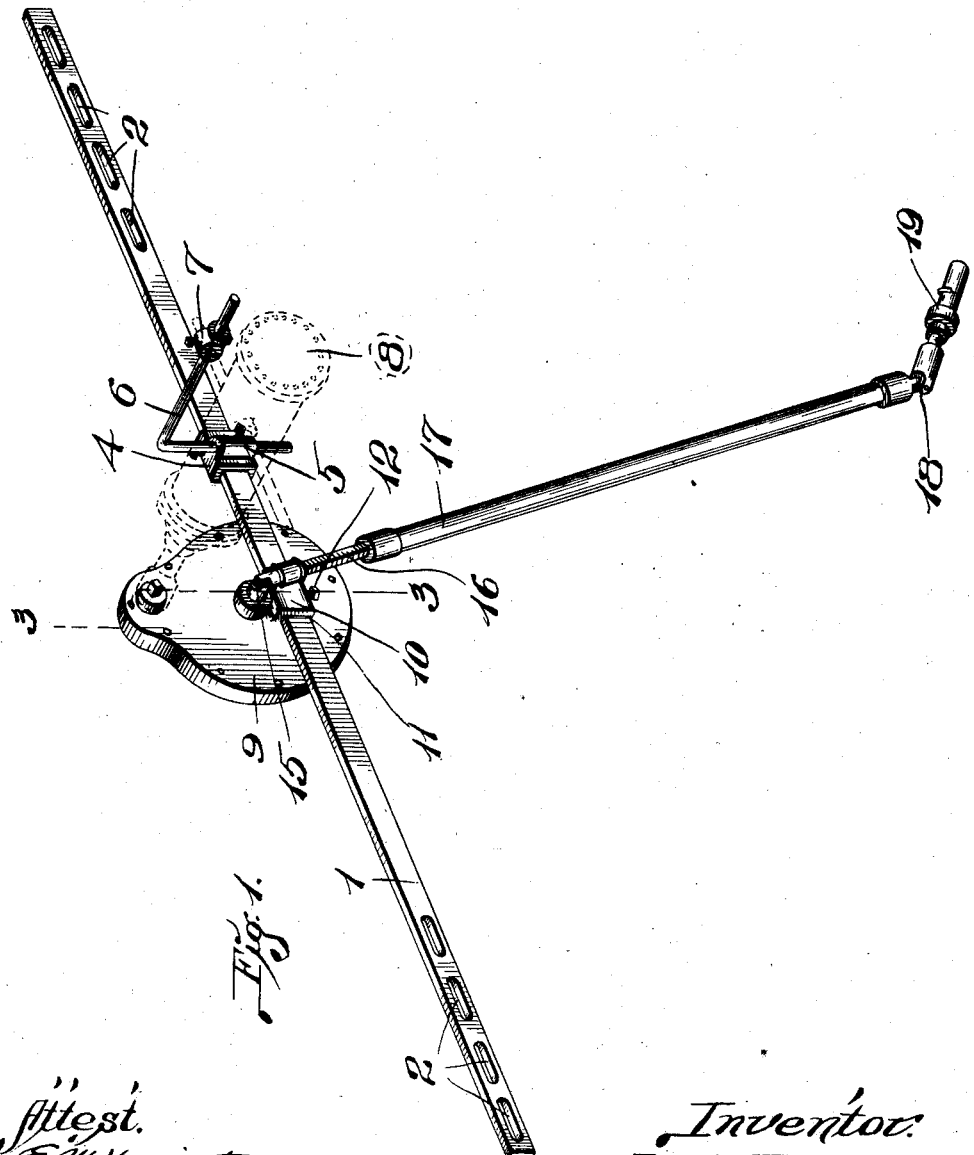
Figure 2:
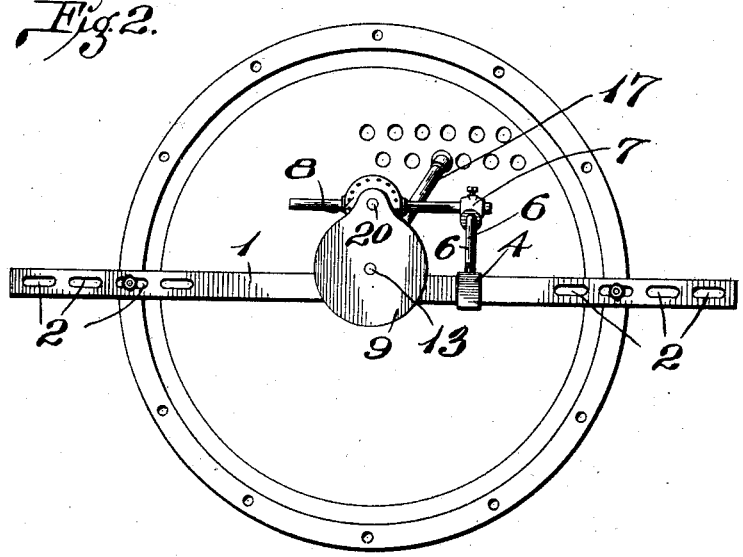
Figure 3:
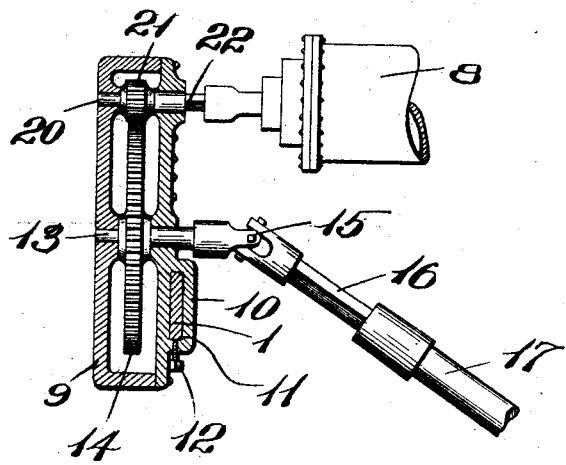

Figure 1 is a perspective view of an apparatus of my improved construction, with the motor shown in dotted lines; Fig. 2 is a front elevation of a boiler with my improved apparatus in position for use thereon; Fig. 3 is an enlarged vertical section taken on the line 3—3 of Fig. 1.

Referring by numerals to the accompanying drawings:—1 designates a supporting bar, through each end of which is formed a series of elongated apertures 2, which receive bolts, or other fastening devices, thus providing means for adjustably positioning said bar on the end of a boiler; and adjustably arranged on said bar is a sliding block 4, with which is formed integral a vertically disposed perforated ear 5, in which is arranged for vertical adjustment the upright member of a bracket 6; and arranged for adjustment on the horizontal member of this bracket is a block 7, which receives one of the handles or supports of an electric or pneumatic motor 8.

9 designates a housing, on one side of which, below the center, is formed a lug 10, through which is formed a rectangular aperture 11, adapted to receive the bar 1, and a set screw 12 passes through the bottom of this lug and bears against the under side of the bar 1 to rigidly hold the housing at any desired position on said bar.

Arranged for rotation in the center of the housing is a transversely disposed shaft 13, on which, within the housing, is fixed a gear wheel 14; and located on the projecting end of said shaft is one of the members of a universal joint 15. The opposite member of this joint is provided with a non-circular shaft 16, which is arranged to telescope in a tube 17, the opposite end of which is connected by means of a knuckle joint 18 to the flue cutter 19, tube expander, or other tool to be driven.

Mounted for rotation in the upper end of the housing 9 is a transversely disposed shaft 20, on which, within the housing, is fixed a pinion 21, which meshes with the gear wheel 14. The projecting end of the shaft 20 is made non-circular, as designated by 22, in order to receive the end of the driving shaft of the motor 8.

When an apparatus of my improved construction is in use, the bar 1 is clamped in position on the end of the boiler, with the motor supported by the bracket 6, immediately opposite the upper portion of the housing 9, and with the motor shaft connected to the end of the shaft 20.

The operator positioned immediately behind the housing manipulates the valve or rheostat controlling the operation of the motor; and, as said motor is driven, the shaft 20 and pinion 21 are rotated, and said rotary motion is transmitted by means of the gear wheel 14 to the shaft 13, and in turn by means of the telescoping shaft to the tool 19, which is manipulated as desired.

By my improved construction, the motor and tool are in front of the operator and are, therefore, in position to be easily handled and controlled.

The apparatus is easily positioned for use, and the various parts thereof can be readily adjusted to suit the requirements of the different classes of work.

I claim:—

The combination with a supporting bar, in the ends of which are formed apertures in order that said bar may be adjustably applied to the end of a boiler, of a housing, a perforated lug integral with the housing, through which lug the supporting bar passes, a pair of shafts journaled in the side walls of the housing, a gear wheel fixed on one of the shafts, a pinion fixed on the opposite shaft, which pinion meshes with the gear wheel, a flexible extensible shaft connected to the extended end of the shaft carrying the gear wheel, a boiler flue tool connected to the end of the flexible shaft, a block adjustably arranged on the supporting bar, an adjustable bracket carried by the block, a motor adjustably carried by the bracket, and the shaft of which motor is detachably connected to the shaft carrying the pinion.

In testimony whereof, I have signed my name to this specification, in presence of two subscribing witnesses.

JOHN W. FAESSLER.

Witnesses:
A. C. DINGLE,
G. R. MAUPIN.